United States Patent [19]

Lucas

[11] Patent Number: 4,775,849
[45] Date of Patent: Oct. 4, 1988

[54] GAS INSULATED CURRENT TRANSFORMER

[75] Inventor: Howard R. Lucas, Toronto, Canada

[73] Assignee: Guthrie Canadian Investments Limited, Scarborough, Canada

[21] Appl. No.: 137,745

[22] Filed: Dec. 24, 1987

[51] Int. Cl.⁴ ............................................. H01F 27/02
[52] U.S. Cl. ................................. 336/90; 174/11 BH; 174/12 BH; 200/148 B; 336/92; 336/94; 336/174
[58] Field of Search ............... 200/148 B; 174/11 BH, 174/12 BH, 30; 336/90, 92, 94, 173, 174, 175

[56] References Cited

U.S. PATENT DOCUMENTS 1,983,370 12/1934 Hillebrand ..................... 174/11 BH
3,178,505 4/1965 Van Sickle ................ 174/12 BH X Primary Examiner—Thomas J. Kozma
Attorney, Agent, or Firm—Stanley E. Johnson

[57] ABSTRACT

A gas insulated current transformer wherein the metal tank having the inductive unit therein is mounted on the hollow insulating bushing and preloaded with spring pressure so that when the insulating gas within the bushing and the container reaches a predetermined and maximum safe limit the excess build up of gas pressure is allowed to escape between the otherwise sealed contact between the container and the bushing.

6 Claims, 1 Drawing Sheet

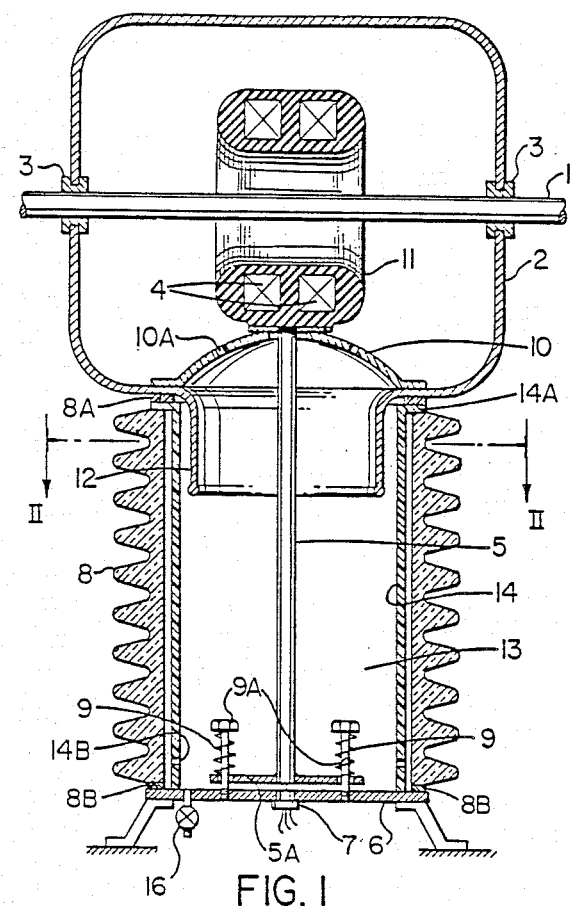
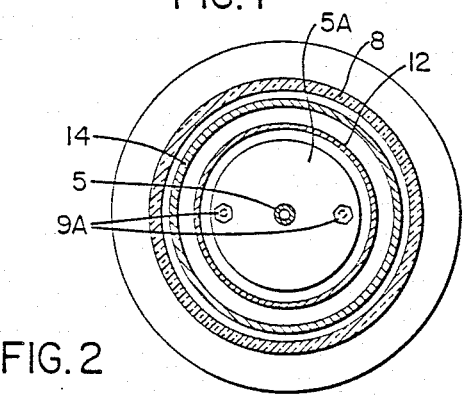

GAS INSULATED CURRENT TRANSFORMER

FIELD OF INVENTION

This invention relates generally to minimizing the risk of gas explosion in transformers, particularly types such as high voltage current transformers.

BACKGROUND OF INVENTION

In the decades of 1950 and 1960 there was a change of practice taking place in electric power utilities' high voltage power transmission systems. The high voltage circuit breakers were being changed from the old, slower acting and less powerful dead tank "bulk oil" circuit breakers, to live tank, air blast breakers of higher capability. These required separate, free standing current transformers, to perform the function of the Bushing Type current transformers previously located within the oil circuit breaker's tanks. In the general the current transformers used were of conventional insulation design; using quantities of kraft paper tape applied to form the high voltage internal insulation; suitably dried, and impregnated with insulating mineral oil, according to well known practices. This insulation system however has a finite life; depending on the design practices, operating temperatures, and insulation preservation systems used by the original makers. End-of life of these units may be signalled by an internal insulation failure, followed by as powerful as electric current as the system can supply, flowing from the high voltage conductors to ground within the unit. The result is often a violent explosion, followed by a fire as result of ignition of the insulating mineral oil which escapes from the damaged unit. The results of such a failure can be extremely damaging to surrounding equipment and hazardous to near-by personnel. It is extremely difficult to predict by practical means, when such a failure is likely to happen.

At the time of development of early North American air blast circuit breakers, this hazard was foreseen. To avoid it, a special design of gas insulated Current Transformer was developed, using Sulpher Hexafluoride (SF$_6$) gas under modest pressure as an insulating medium, according to the teaching of U.S. Pat. No. 2,261,671, issued Nov. 4, 1941. These units were completely fire-proof and were considered to be non-deteriorating and with minimal explosion risk. The reduced risk of explosion in the event of an internal fault is due to the fact that an electric arc occurring in the gas causes a more gradual and many times lower rise of pressure within the unit, than that which occurs in a conventional oil-and-paper insulated transformer. In the latter, the electric arc being of extremely high temperature, decomposes the paper and oil explosively, into highly combustible gasses, with an instantaneous volume increase of many orders of magnitude. The physical effect is the same as ignition of a considerable charge of high-explosive material.

The surrounding liquid is an excellent transmission medium for the resultant shock wave. The casing and porcelain insulators comprising the enclosure for the apparatus are blown apart, and the ensuing electric arcs ignite the vapours and liquid oil so liberated and brought into contact with air, which supports the combustion of these substances.

In the gas insulated transformer, on the other hand, the arc is passing through material which is already gaseous. It may be dissociated by the heat of the arc into other gaseous materials, and it will be increased in volume by the heating effects of the arc itself. The resulting rise of pressure, in the vessel which comprises the enclosure of the apparatus is much more gradual and orders of magnitude lower in severity than the previously described event, in a conventional oil-and-paper insulated transformer.

Many gas insulated high voltage current transformers were produced in United States and Canada in the period of about 1956 to 1965 and have given excellent service. Their initial costs were high however, compared to the competing oil-filled units, and manufacture in North America ceased about 1970. Oil filled current transformers continued to supply the needs of the electric utilities.

In recent years there has been increasing concern among electric power utilities because of the number of explosive failures as described above, occurring among these oil-filled units. Some utilities have now specified a new acceptance test on replacement current transformers, to demonstrate that in the event of an internal fault in the unit, and consequent high power electric current there-through; an explosion would not occur. The test current is chosen to be higher than the power system can deliver in practice; and tests must be performed at a special high power test laboratory capable of generating such current with precisely controllable magnitude. No oil-filled current transformers can meet this test requirement without violently bursting. Gas insulated current transformers with conventional porcelain high voltage insulators, as have been produced in the past, are also incapable of meeting these test requirements. In practice, the procelain is fractured and the normal operating pressure contained within the unit is sufficient to hurl the shattered fragments outward with considerable force. Previous attempts to construct an "explosion-proof" current transformer using the highly desirable high voltage porcelain insulators have been unsuccessful.

It has been known practice to replace the porcelain insulator by a composite insulator of resinous material, reinforced with high-strength fibrous material, such as fibreglass. Thus the bursting of the procelain insulator is avoided. However, this composite insulator has several disadvantages. For example, it is not as homogeneus or as weather-resistant as the porcelain it is replacing, and must be protected from weather by some external shield or covering. It is also much more permeable to moisture, and can allow the external humidity, always present in the air around it, to pass through and build up to dangerous levels within the said apparatus; where it can cause an internal fault to occur by condensation upon the internal insulating surfaces of the apparatus. The use of these composite insulators to replace the main porcelain insulator is therefore undesirable.

SUMMARY OF INVENTION

A principle object of the present invention is to reduce or minimize the risk of explosion in gas insulated transformers.

The present invention concerns providing a gas insulated current transformer with a porcelain main insulator of such design and construction that damaging explosions as the result of an internal fault in the apparatus while in service are at least minimized, if not prevented. The newly specified test requirements are met with devices of the present invention.

The particular embodiment of the invention, herein described, consists of a "head type" or live-tank current transformer; of this type described in Canadian Pat. No. 773,265, issued Dec. 5, 1967. This type is particularly advantageous for use with high current ratings, (e.g. 1500 amperes and higher) especially when the available fault currents on the power system to which the apparatus is connected are quite high. A similar transformer, using gaseous insulation, is described in U.S. Pat. No. 3,380,009 (Miller, Apr. 23, 1968). This latter patented device is in many ways similar to the device herein described, but has no provision for limiting over-pressures which occur in the event of an internal fault, nor for protection of the porcelain insulator from the effects thereof. It therefore fails to meet the basic objective of this invention.

Although the present invention is described in reference to a current transformer, the principles involved are applicable to other constructions, and types of current transformers and similar apparatus, and thus it is not intended to be limited strictly or solely to the particular apparatus described herein.

In accordance with the present invention there is provided a high voltage transformer comprising (a) a base; (b) a hollow insulating bushing having a bottom end sealingly engaging said base; (c) a hollow tank having a wall thereof sealingly engaging an open top end of said bushing, said tank wall having an opening therethrough communicating with the hollow interior of said bushing; (d) an electrical inductive unit located within said hollow tank and having leads therefrom extending to said base; (e) spring means anchored respectively to said base and hollow tank and tensioned to apply an axial preselected compressive force on said bushing; and (f) an open-ended sleeve liner spaced inwardly from the inner wall surface of said bushing, said liner abutting said base at one end and having an outwardly flared flange at the other end clampingly engaged between said bushing and said hollow tank.

LIST OF DRAWINGS

The invention is illustrated by way of example in the accompanying drawing, wherein:

FIG. 1 is a vertical sectional view of a device constructed in accordance with the present invention; and FIG. 2 is a horizontal section taken essentially along line 2—2 of FIG. 1.

DESCRIPTION OF PREFERRED EMBODIMENT

One embodiment of the invention is shown in the drawings which illustrates a high voltage current transformer of the "live tank" or "Head Type". It consists of a primary conductor 1 passing horizontally through a metallic tank 2 and insulated therefrom by insulators 3. The current to be measured passes axially along conductor 1. The secondary windings are located on magnetic cores 4 located co-axially about the primary conductor, and leads of the secondary are brought down through a pipe centre post 5 and then through a base plate 6 by means of an insulating feed-through 7. The upper metallic tank 2 is supported by a main insulator 8 and sealed thereto by suitable gaskets 8A. Similar gaskets 8B are of course used at the junction of the main porcelain insulator 8 with the base plate 6.

The upper tank 2 is clamped against the main insulator by means of springs 9 pressing axially downward on a flange 5A attached securely to the bottom end of the centre post 5. The post 5, at the upper end, presses against a compression insulator 10 that bears against the inside of the tank 2 and holds it firmly against the top of insulator 8. The springs 9 are compression springs that via bolts 9A are anchored to the base plate 6.

The secondary windings and cores 4 are also supported at the top end of the centre post and firmly attached thereto.

For purposes of control of the electrical fields within and around the apparatus, metallic shields 11 and 12 surround the secondary windings and project downwards inside the main porcelain insulator 8. In order to prevent the pieces of the main insulator from being thrown outwards by the pressure of the insulating gas 13 in the event of accidental breakage of the porcelain, an insulating liner member 14 is fitted closely inside the porcelain and flanged outwards at its upper end to contact the bushing. As illustrated, the outward flange 14A is clampingly engaged between the compression insulator 10 and the main insulator 8. The lower end of liner 14 is fixed against the base plate 6 by conventional means but not sealed thereto. Small radial vent holes 14B through the liner may be used to allow gradual passage of the insulating gas 13 so that the pressures inside and outside the liner are equalized in normal operation. Similar vent holes 10A are also provided in the clamping plate 10 at the top end of the centre post so that the insulating gas 13 can pass freely through from the metallic tank 2 to the space inside of the main insulator 8. The insulating gas 13 is admitted to the assembly through valve 16 attached to the base plate.

It will be immediately obvious to those skilled in the art, that the secondary windings and cores are strongly supported on a rigid centre clamped main insulator. The primary conductor passing through the tank and co-axially through the secondary windings are also rigidly supported on the main insulator via said tank. The only insulation between the primary conductor and secondary windings is the insulating gas 13 which is maintained at the required pressure to achieve the desired insulation strength. The other insulating components operate at a considerably lower stress level, and their requirements are less stringent.

In the event of loss of insulation strength by reduction of gas pressure and/or if an overvoltage is applied to the apparatus (above the ability of the gaseous insulation to withstand) an arc may occur between the primary conductor 1 and the secondary winding shields 11 or between the metallic shield 12 and the centre post 5. The design is arranged so that the maximum voltage stress area is between the neck 12 of the metallic casing 2 and the centre insulated post 5 so that this is where the power arc will tend to occur, if there is an internal insulation failure for either of the above reasons. In normal operation the pressure is maintained so that the internal strength exceeds the external flashover level of the main insulator, so an internal failure is unlikely to occur.

If an arc occurs in the above location, an enormous amount of energy is released thereby heating the gas in its immediate vicinity. This causes rapid expansion and the gas pressure within the structure rises rapidly. It quickly develops a pressure greater than the compression springs 9 can retain, and the tank lifts off the gaskets at the top of the main insulator, venting the gas inside and relieving the pressure build-up, limiting it to values that the procelain insulator can safely withstand.

As an added safety feature, the liner cylinder 14 slows down the rate of rise of pressure against the inside surface of the porcelain; and also shields it from contact with the hot gasses generated by the arc; so that it is not damaged during the failure. The combination of features described in the above invention results in a current transformer with a high voltage porcelain insulator, as desired, which meets the specified test requirements without explosive rupture of its parts, as required by the new specifications.

With respect to some alternatives to the foregoing, bolts 9A can pass through instead of being threaded into apertures in base plate 6 and have nuts for adjusting the compressive force exerted by springs 9, or bolts 9A can have extensions below the plate if threaded in the plate by which they can be turned to accomplish the same result. In addition to, or as an alternative to springs 9, the dish shaped disc 10 can provide predetermined spring characteristics and serve to allow escape of gas past seal 8A (and/or 8B) when the gas pressure within the tank and bushing has reached a predetermined limit.

The present invention consists of a combination of design features to produce a high voltage current transformer with the highly desirable high voltage porcelain main insulator, which is capable of meeting the new specifications for an explosion-proof current transformer. What is novel is the combination of design and materials to meet an extremely stringent requirement previously impossible to meet with conventional construction. The combination of features consists of the following:

A high voltage current transformer in which the only component of the major internal insulation is a gas. The only other component of major insulation from high voltage to ground is the porcelain main insulator with conventional weather-sheds. The main insulator is held in compressive loading by an axially-located metallic tensile member which is spring loaded. Shielding and field-shaping electrodes are provided to control the uniformity of the electric field in critical regions, producing a highly predictable insulation strength of the structure, which is dependent in a known manner on the pressure of gas used. The insulating gas used may be Sulphur Hexafluoride ($SF_6$) or other suitable gaseous insulation.

The porcelain insulator is provided with a closely-fitting insulating liner, of separate construction and spaced radially therefrom so a small space of compressible gas is contained therebetween. One end of the liner cylinder is flanged outwards across the end face of the porcelain insulator, so that in the event of an over-pressure within the unit caused by a power arc passing through the gas to ground, the spring pressure on the axial clamping medium being exceeded, and the assembly is vented to atmosphere by lifting off the gaskets at this end of the porcelain; the flanged end of the liner cylinder protects the porcelain from the heating effects of the escaping hot gasses and so prevents its fracture. It also shields the procelain from the initial shock wave developed by the arc, and the following heat which radiates from the arc as long as the current is permitted to flow. Thus the pressure is relieved by the venting action of the springs and other component parts, the severity of the shock is reduced by the gas insulation, and the porcelain is saved from damage by the actions of the liner cylinder.

The embodiments of the invention in which an exclusive property or privilege is claimed are defined as follows:

1. A high voltage transformer comprising:
   (a) a base;
   (b) a hollow insulating bushing having a bottom end sealingly engaging said base;
   (c) a hollow tank having a wall thereof sealingly engaging an open top end of said bushing, said tank wall having an opening therethrough communicating with the hollow interior of said bushing;
   (d) an electrical inductive unit located within said hollow tank and having leads therefrom extending to said base;
   (e) spring means anchored respectively to said base and hollow tank and tensioned to apply an axial preselected compressive force on said bushing; and
   (f) an open-ended sleeve liner spaced inwardly from the inner wall surface of said bushing, said liner abutting said base at one end and having an outwardly flared flange at the other end clampingly engaged between said bushing and said hollow tank.

2. A device as defined in claim 1 wherein said hollow tank has a neck surrounding the opening in the wall thereof and wherein said neck projects into the interior of said bushing.

3. A device as defined in claim 1 wherein said inductive device is mounted on a pipe centre post having spring means acting between such post and said base to compress the bushing between said tank and said base, and wherein the leads from said inductive device pass through said pipe.

4. A device as defined in claim 3 including a disc-like member surrounding said post and bearing against the inner wall surface of said tank.

5. A device as defined in claim 4 wherein said disc-like member is disk-shaped.

6. An improved gas insulated current transformer comprising a base plate, a cylindrical open-ended insulating bushing having one end thereof sealingly engaging said base plate, a hollow metallic tank having a wall thereof sealingly engaging an open top end of said bushing, said tank wall having an opening therethrough communicating with the hollow interior of said bushing and surrounded by a neck projecting downwardly into the interior of the bushing and spaced radially inwardly from the inner wall thereof, a primary conductor passing through said tank and insulated therefrom and having secondary windings within the metallic tank located on magnetic cores and surrounding said primary conductor, a pipe centre post having said secondary mounted on one end thereof and having the opposite end terminating in close proximity to said base, said post extending axially through said bushing, a compression insulator anchored to said secondary and post unit and abutting said tank on the interior surface thereof in the vicinity of the opening, spring means acting between said hollow tank and base plate applying on said bushing predetermined axial compressive forces and a sleeve liner interiorally opposite the bushing and spaced from the inner wall thereof, said sleeve liner having an outwardly flared flange clampingly engaged between said hollow tank and the open upper end of the bushing.

* * * * *